United States Patent
Ethiraj et al.

(10) Patent No.: US 9,483,374 B2
(45) Date of Patent: Nov. 1, 2016

(54) PSMI USING AT-SPEED SCAN CAPTURE

(75) Inventors: Vinothkumar V. Ethiraj, Bangalore (IN); Kevin D. Safford, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/993,318

(22) PCT Filed: Dec. 21, 2011

(86) PCT No.: PCT/US2011/066656
§ 371 (c)(1),
(2), (4) Date: Jun. 11, 2013

(87) PCT Pub. No.: WO2013/095469
PCT Pub. Date: Jun. 27, 2013

(65) Prior Publication Data
US 2014/0089737 A1 Mar. 27, 2014

(51) Int. Cl.
G06F 11/00 (2006.01)
G06F 11/263 (2006.01)
G06F 11/26 (2006.01)
G06F 11/267 (2006.01)

(52) U.S. Cl.
CPC ........... G06F 11/263 (2013.01); G06F 11/261 (2013.01); G06F 11/267 (2013.01)

(58) Field of Classification Search
CPC ............... G06F 11/263; G06F 11/261; G06F 17/5022; G01R 31/318357
USPC ..................................................... 714/32, 33
See application file for complete search history.

(56) References Cited

U.S. PATENT DOCUMENTS

| 7,401,272 B1 | 7/2008 | Birk et al. |
| 7,617,425 B2 | 11/2009 | Nadeau-Dostie et al. |
| 7,882,000 B2 | 2/2011 | Jones |
| 2003/0154430 A1* | 8/2003 | Allen ................... G06F 11/364 714/45 |

(Continued)

FOREIGN PATENT DOCUMENTS

TW 200634509 A 10/2006

OTHER PUBLICATIONS

Dictionary definition retrieved from https://en.wikipedia.org/wiki/Debugger.*

(Continued)

*Primary Examiner* — Yair Leibovich
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for implementing and using PSMI using at-speed scan capture. For example, in one embodiment, such a system includes an input signal capture device to capture input signals input to a silicon processor under test; a scan capture device to capture a scan snapshot representing a known state of a plurality of digital elements integrated within the silicon processor under test, each having state data for the silicon processor under test; a scan read-out device to communicate the captured scan snapshot to a storage point physically external from the silicon processor under test; and a model of the silicon processor under test to replay a subset of a test sequence for the silicon processor under test based at least in part on the captured input signals and the captured scan snapshot.

23 Claims, 13 Drawing Sheets

(56) References Cited

U.S. PATENT DOCUMENTS

2009/0125770 A1   5/2009   Parulkar
2011/0179309 A1*  7/2011   Pathirane .......... G06F 11/3648
                                                         714/37

OTHER PUBLICATIONS

Dictionary definition retrieved from https://en.wikipedia.org/wiki/Software_testing.*

PCT International Search Report for PCT Counterpart Application No. PCT/US2011/066656, 3 pgs., (Sep. 25, 2012).
PCT Written Opinion of the International Searching Authority for PCT Counterpart Application No. PCT/US2011/066656, 3 pgs., (Sep. 25, 2012).
PCT Notification concerning Transmittal of International Preliminary Report on Patentability (Chapter I of the Patent Cooperation Treaty) for PCT Counterpart Application No. PCT/US2011/066656, 5 pgs., (Jul. 3, 2014).
Taiwan IPO Search Report from foreign counterpart Taiwan Patent Application No. 101145432, mailed Jul. 7, 2014, 1 page.

* cited by examiner

PSMI USING AT-SPEED SCAN CAPTURE

CROSS-REFERENCE TO RELATED APPLICATIONS

This patent application is a U.S. National Phase Application under 35 U.S.C. §371 of International Application No. PCT/US2011/066656, filed Dec. 21, 2011, entitled PSMI USING AT-SPEED SCAN CAPTURE.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing and using PSMI (Periodic System Management Interrupt) using at-speed scan capture.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

An essential component of any silicon validation program is the capability to quickly and efficiently reproduce system failures on the RTL model (register-transfer level model) of the chip under test, in the case of a logic issue, or on the tester, in the case of a circuit issue. The major problem of reproduction is to ensure that silicon behavior on the system is absolutely synchronized with that of the RTL model tester. This is because most failures occur far beyond the reset point. The reset point presents a known state, for example, at the beginning of test, but information within the processor arrays and registers (e.g., caches, TLBs (Translation lookaside buffers), branch predictors, etc.), change during the course of the test, and differ at the failure point from the reset point. With conventional mechanisms, a "dump" of many, but not all, information states is available at the failure point, but it is completely unknowable what the information states are for intermediate periods between the start of test and the failure point.

Debugging post-silicon system failures within guaranteed time duration is a major challenge. Even with increasing focus on debug methods, it still requires several experts to be available for the duration of the debug. The experts themselves are rare resource due to their skill set, and thus, sufficient expert resources may be unobtainable to debug all errors during an acceptable period of time.

Improved visibility and debug methodologies and tools are needed to improve debug times, reduce the level of expertise needed to perform post-silicon system failures, and improve the capability to diagnose and root case failures.

The present state of the art may therefore benefit from systems and methods for implementing and using PSMI using at-speed scan capture as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
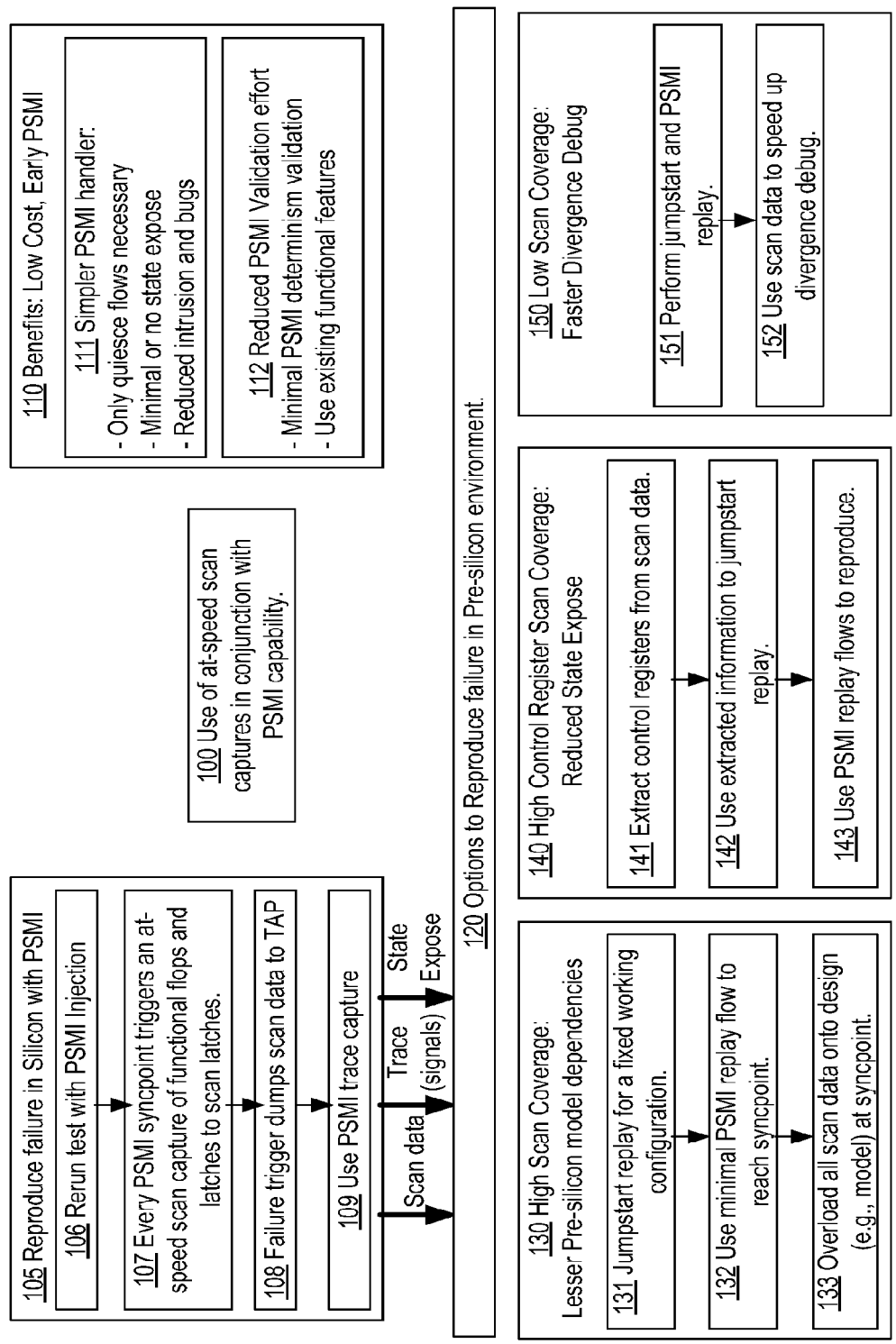
FIG. 1 illustrates a chart having various options in accordance with the disclosed embodiments.

Described herein are systems and methods for implementing and using PSMI using at-speed scan capture.

For example, in one embodiment, such a system includes an input signal capture device to capture input signals input to a silicon processor under test; a scan capture device to capture a scan snapshot representing a known state of a plurality of digital elements integrated within the silicon processor under test, each having state data for the silicon processor under test; a scan read-out device to communicate the captured scan snapshot to a storage point physically external from the silicon processor under test; and a model of the silicon processor under test to replay a subset of a test sequence for the silicon processor under test based at least in part on the captured input signals and the captured scan snapshot.

Strict PSMI (Periodic System Management Interrupt), without the use of at-speed scan capture, requires bringing the silicon, such as a silicon processor under test, into a completely known and reproducible state, referred to as a syncpoint. Trace capture of the required chip input and boundary signals are stored, and then an equivalent pre-silicon model is jumpstarted to attain the same syncpoint, and the input traces are applied. If all components function correctly, then a failure mode on the silicon induced via a test sequence can be cycle accurately reproduced in pre-silicon using the equivalent pre-silicon model.

Unfortunately, PSMI as a planned debug tool is getting increasingly complicated and costlier to make PSMI work reliably. Products targeting new market segments do not always support PSMI because of the complexities involved in current PSMI flows.

DFT (Design for Test) scan methods enable at-speed scan capture of functional flops and latches to scan latches without being destructive into the scan behavior. The scan latches can be readout through a TAP (Test Access Port) after the failure mode induced by a test sequence, sometimes referred to as iScan SCB observe.

Use of at-speed scan capture for PSMI flows may help to reliably attain a PSMI syncpoint with less effort. For example, during PSMI syncpoints, a trigger may be used to initiate an at-speed scan capture of functional flops and latches to scan latches. Notably, the triggered at-speed scan capture captures the state data for the functional flops and latches into the scan latches without being destructive to the test sequence. Thus, the test sequence may recommence after the at-speed scan capture. After the failure mode on the silicon processor under test, the scan latches can then be read out through TAP. This scan data can then be used in several means to aid with attaining a PSMI syncpoint in replay. Although on-die RAMs (Random Access Memories), SRAMs (Static RAMs) and/or Register Files (arrays) may not have scan support, PSMI methods may nevertheless be utilized to capture their state data to produce a known state. Trace capture, pre-silicon simulation and/or emulation modeling, and determinism across variable latency paths and other components may be conducted with current PSMI capabilities and other known mechanisms.

The systems, methods, and mechanisms disclosed herein may improve debugging of failures on a silicon processor under test using a pre-silicon model. For instance, using conventional mechanisms, most failures must be debugged by experts using manual methods with DFT (Design For Test) or special debug hooks. Some CPU segments use PSMI to reproduce post-silicon failures in a pre-silicon model. Nevertheless, reliably enabling PSMI presents at least the following challenges: (1) PSMI requires comprehensive treatment of all the state elements in the chip, which may be achieved by reviews and exhaustive pre-silicon validation; (2) PSMI flows require a complex PSMI handler to do necessary state exposing, quiescing of the system's silicon processor under test to attain PSMI syncpoint; (3) PSMI requires a BIOS equivalent to initialize the system's silicon processor under test in emulation during replay; and (4) significant effort is spent in ensuring that an emulation environment model of the silicon processor under test supports any legally valid post-silicon configuration.

Practice of the disclosed embodiments utilizes at-speed scan capture to attain a PSMI syncpoint. Practice of the disclosed embodiments may therefore reduce the effort to validate that the chip can be brought into a known and reproducible state by improving the manner in which a PSMI syncpoint is attained, which is then utilized for pre-silicon validation. Practice of the disclosed embodiments may further remove complexity from a PSMI handler by avoiding expose and load of control and status registers which in turn reduces the intrusiveness of the PSMI flow by exposing less state of the silicon processor under test. Further still, dependency is reduced on the pre-silicon emulation environment by loading the data from scan capture only at syncpoint on to the design via, for example, an equivalent model of the silicon processor under test and PSMI divergence debug is eased by making use of the state captured using scan.

In accordance with one embodiment, during a PSMI collect flow, every PSMI syncpoint will trigger at-speed capture of functional flops and latches on to available scan latches. After a failure mode is induced by a test sequence run against the silicon processor under test, the scan data will be read out through a TAP (Test Access Port). The scan data may thus be extracted and used in replay within an equivalent model of the silicon processor under test depending on the extent of scan coverage. Some PSMI replay flows can be performed without using scan data. In cases of divergence, information from scan data may be used to speedup divergence debug, for example, by jumpstarting to a syncpoint, and thus, bypassing much of the replay of the test sequence within the model.

PSMI handlers and other firmware may provide about 60% to 80% of coverage via handler runtime and development time and utilize information from the scan to ensure that visibility for the remaining coverage not exposed via PSMI handlers is visible within the model at replay.

Practice of the disclosed embodiments may drastically reduce the effort involved in reliably reproducing post-silicon system failures in pre-silicon models, and hence increase debug throughput. On designs where PSMI is already available, practice of the disclosed embodiments reduces the PSMI development and validation effort; simplifies the PSMI handler and minimizes intrusion due to PSMI; provides a more reliable work around for PSMI determinism issues; and enables early success of PSMI during the post-silicon cycle. Practice of the disclosed embodiments may therefore make it simpler to make PSMI available on designs without PSMI by using existing scan techniques, trace capture infrastructure, pre-silicon models, and a means to quiesce the system.

Practice of the disclosed embodiments may provide better total scan coverage. For instance, much effort is spent in bringing up a replay environment to the same configuration as that of platform having the actual silicon processor under test. Bring up the replay environment creates challenges in having a BIOS like equivalent for pre-silicon replay and ensuring that the replay environment (typically emulation but sometimes simulation or a combination of both) supports any platform configuration. Practice of the disclosed embodiments therefore enable replay platforms to have a very simple BIOS and replay environment to bring-up the replay in a simple fixed configuration, reach PSMI syncpoint and then load scan data onto the design only at syncpoint. Since traces are used to drive back after replay, the replay environment does not even require support for the respective platform configuration. Test platform systems may employ means to (a) fully quiesce the system (b) capture traces as input signals to the silicon processor under test; and (c) provide a pre-silicon model, without necessarily requiring special treatment for PSMI syncpoints. In such cases, PSMI may still be employed as a debug tool with very little added cost and effort.

The extent of flops and latches covered by a scan is a crucial parameter with respect to coverage and visibility. By suitably deciding on the scan coverage, practice of the disclosed embodiments may be used even if systems have much less than 100% scan coverage. For example, because the silicon processor under test may need to be quiesced to bring some of the arrays to a known state, a significant portion of flops and latches may get to known state by virtue of the quiesce phase and thus, it may not be necessary to have scan coverage for such flops and latches. Even where the DFT, power good, and reset related functional blocks (fubs) don't have scan, practice of the disclosed embodiments may still be made to work by appropriately deciding when to capture state and trace. For example, by ensuring that between a last captured syncpoint and failure mode for the silicon processor under test, there are no reset or unsupported events which may otherwise yield less than 100% coverage.

Practice of the disclosed embodiments may drastically increase post-silicon system debug throughput, for example, by employing the disclosed systems and methods with projects where the scan capture can be done at run-time, thus significantly increasing the success of PSMI where implemented, reducing the development and validation cost, and allowing PSMI mechanisms to be extended to segments where they were not previously possible.

For example, consider when you cut the silicon back in the lab. When running test content on the silicon and a failure is encountered, debug must be performed. The closer to launch of the silicon, the less time and resources may be applied to fully debug the failure mode. Debug is simplified if you can reproduce the failure mode in a model of the pre-silicon environment. For example, if a chip has 1 million flops (e.g., digital logic and latches) and you have visibility to the behavior to each and every flop, then it will be is easier to debug the failure mode if you have the behavior of the one million flops over the last few milliseconds of real-time preceding the failure on the silicon processor under test. Even knowing the behavior of a large percentage of the flops for the 1 millisecond before the failure will greatly simplify the debug effort because the root cause is likely to be in the last moments of processing the test sequence on the silicon processor under test preceding the failure mode.

Nevertheless, conventional techniques do not provide visibility for the slice of time leading up to the failure mode. Thus, conventional techniques involve checking the value of all the one million flops right at the failure provided as a scan output data dump. Unfortunately, this provides only one time instance at the moment of failure, and gives nothing for the time leading up to the failure. Debug thus requires experts to go in and debug the failure mode with only very limited information.

Thus, improved mechanisms are necessary to provide visibility into the functional flops and digital elements of the silicon processor under test and to provide visibility into behavior of the silicon processor during the moments preceding a failure mode.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a system to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

Refer to FIG. 1 which illustrates a chart 100 having various options in accordance with the disclosed embodiments. For example, the chart 100 shows the use of at-speed scan captures in conjunction with PSMI capability. Benefits 110 may include low cost and early PSMI. For example, at block 111, a simpler PSMI handler results from having only to quiesce flows where necessary, providing minimal or no state expose, and causing reduced intrusion and bugs. At block 112, reduced PSMI validation effort is required through minimal PSMI determinism validation and use of existing functional features.

At block 105, reproducing a failure in silicon with PSMI may include block 106 to rerun a test sequence with PSMI injection; block 107 in which every PSMI syncpoint triggers an at-speed scan capture of functional flops and latches to scan latches; block 108 in which a failure trigger (e.g., at a failure mode of the silicon processor under test) dumps scan data to TAP; and at block 109 use of PSMI trace capture. Flow then proceeds to block 120 showing options to reproduce failure in pre-silicon environment, in which inputs include scan data, trace (e.g., signals), and state expose.

At option block 130, a high scan coverage is depicted and lesser pre-silicon model dependencies are required. At block 131 jumpstarting replay for a fixed working configuration; at block 132 use of minimal PSMI replay flow to reach a syncpoint; and at block 133 overload all scan data onto design (e.g., a model of the silicon processor under test) at syncpoint.

At option block 140, a high control register scan coverage is depicted and reduced state expose is required. At block 141 extract control registers from scan data; at block 142 use extracted information to jumpstart replay; and at block 143 use PSMI replay flows to reproduce the failure mode within the model.

At option block 150, a low scan coverage is depicted and faster divergence debug is provided. At block 151 perform jumpstart and PSMI replay and at block 152 use scan data to speed up divergence debug.

Figure 2:
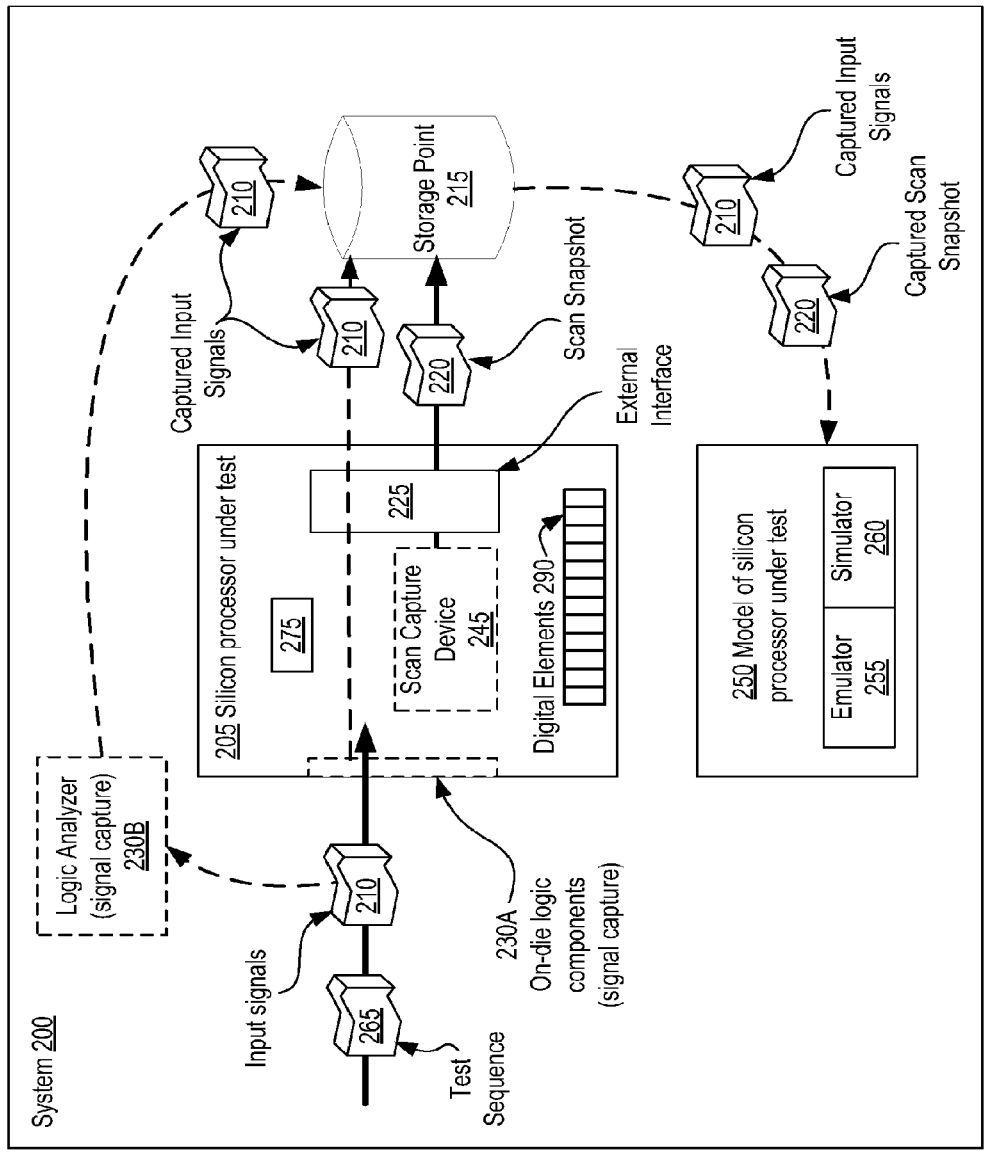
FIG. 2 illustrates an exemplary architecture in which embodiments may operate.

FIG. 2 illustrates an exemplary architecture 200 in which embodiments may operate. For example, system 200 depicts an input signal capture device at elements 230A and 230B to capture the input signals 210 input or applied into the silicon processor under test 205. A scan capture device 245 captures a scan snapshot 220 representing a known state of a plurality of digital elements 290 integrated within the silicon processor under test 205, each having state data for the silicon processor under test 205. A scan read-out device, such as the external interface 225 communicates the captured scan snapshot 220 to a storage point 215 physically external from the silicon processor under test 205. And a model 250 of the silicon processor under test 205 replays a subset of a test sequence 265 for the silicon processor under test 205 based at least in part on the captured input signals 210 and the captured scan snapshot 220.

As depicted, the input signal capture device includes a logic analyzer 230B to capture the input signals 210 applied to the silicon processor under test 205 in accordance with one embodiment. In an alternative embodiment, the input signal capture device includes one or more on-die logic components 230A integrated with the silicon processor under test 205 to capture the input signals 210 into the silicon processor under test 205.

In one embodiment, the model 250 of the silicon processor under test 205 replays the subset of the test sequence 265 external to and physically separate from the silicon processor under test 205. For example, as shown, the model 250 is a design representation of the silicon processor under test 205, but is distinct from it, and operates separately from the silicon processor under test 205.

In one embodiment, the model 250 of the silicon processor under test 205 produces a cycle accurate representation of the subset of the test sequence 265 for the silicon processor under test 205 within the model 250. For example, the model 250 behaves on a cycle by cycle basis as though it was the actual silicon processor under test 205. In one embodiment, the model 250 of the silicon processor under test 205 includes a simulator 260 implemented in software, an emulator 255 implemented via, for example, a field-programmable gate array (FPGA) integrated circuit, or a combination of both the simulator 260 and the emulator 255.

In one embodiment, the scan capture device 245 includes an at-speed scan capture device to trigger an at speed capture of functional flops and latches within the silicon processor under test 205 onto scan latches within the silicon processor under test 205. For example, the functional flops and latches may be one or more of the digital elements 290 within the silicon processor under test 205. Similarly, the scan latches within the silicon processor under test 205 may write to one or more of the digital elements 290.

In one embodiment, the at-speed scan capture device 245 captures the functional flops and latches onto the scan latches without altering state data within the functional flops and latches and without requiring termination of the test sequence 265. In accordance with one embodiment, the silicon processor under test 205 recommences the test sequence 265 on the silicon processor under test 205 after the capture of the functional flops and latches onto the scan latches. In such an embodiment, the scan read-out device further includes a test access port (TAP) to communicate the captured scan snapshot 220 to a storage point 215 physically external from the silicon processor under test 205 after termination of the test sequence 265 due to a failure mode of the silicon processor under test 205. For example, the at-speed scan capture may trigger and run during the test sequence, yet refrain from outputting the captured scan data for the duration of the test sequence. Only after a failure mode is reached does the TAP or other external interface communicate the captured scan snapshot to an external storage point 215.

In one embodiment, the scan read-out device includes or is implemented via an external interface 225 which extracts the captured scan snapshot 220 from the silicon processor under test 205 to the storage point 215 physically external from the silicon processor under test 205. In one embodiment, the input signal capture device includes an external interface 225 to further communicate the captured input signals 210 to a storage point 215 physically external from the silicon processor under test 205 for persistent storage and later retrieval.

In one embodiment, the scan capture device 245 includes: (a) an at-speed scan capture device to trigger an at speed capture of functional flops and latches within the silicon processor under test 205 onto scan latches within the silicon processor under test 205; and further includes (b) a quiesce unit 275 to quiesce the silicon processor under test 205 to train and invalidate SRAMs (Static Random Access Memories) internal to the silicon processor under test 205.

In one embodiment, a quiesce unit 275 captures state data of the respective SRAMs. For example, in one embodiment, the scan capture device 245 captures the scan snapshot 220 by stopping the clock and initiating a single clock pulse triggering the capture of the scan snapshot 220 from a present state to the captured state for the scan snapshot 220 representing the known state of a plurality of digital elements 290 integrated within the silicon processor under test 205. In one embodiment, the quiesce unit 275 quiesces the silicon processor under test 205 before the scan snapshot 220 is captured.

For example, when using iScan SCB observe to perform a snapshot from the original flop to the scan flop, it may be necessary to stop the clocks first. Once stopped, a single clock pulse is created to go and perform the snapshot from the original flop to the scan flop. On the trigger, such as an injected interrupt or other event, the clock is stopped, a clock pulse is created to capture the value from original to the scan, and then using the TAP interface the scan is extracted.

In one embodiment, the silicon processor under test 205 performs one or more of the following operations during a quiesce phase responsive to the quiesce unit 275: (a) stop accepting new requests; (b) waiting for all prior requests to complete; (c) invalidating a first plurality of on-die SRAMs (Static Random Access Memories) due to entry into the quiesce phase; (d) flushing a second plurality of on-die SRAMs to an invalid state responsive to a flush instruction initiated during the quiesce phase; (e) invalidating a first plurality of flip-flop and latch circuits internal to the silicon processor under test 205 due to entry into the quiesce phase; and (f) copying state data from a second plurality of flip-flop and latch circuits internal to the silicon processor under test 205 into a corresponding plurality of shadow flops, in which each of the shadow flops preserve the copied state data as known state data for the corresponding second plurality of flip-flop and latch circuits. Where data is invalidated or made to an invalid state due to a flush, training event, or simply due to inactivity, the state data for the corresponding digital element 290 is at a known state, which happens to be an invalid state. Conversely, other digital elements 290 do not invalidate or cannot appropriately be invalidated, such as counters, and thus, their values must be copied, for example, to shadow flops.

In one embodiment, the plurality of digital elements 290 integrated within the silicon processor under test 205 includes digital elements 290 selected from the group including: flip-flop circuits, each having state data in the silicon processor under test 205; latch circuits, each having state data in the silicon processor under test 205; and on-die cache SRAMs (Static Random Access Memories) having memory to store state data within the silicon processor under test 205.

For example, a flip-flop or latch is a circuit that has two stable states and can be used to store state information. The circuit can be made to change state by signals applied to one or more control inputs and will have one or two outputs. Flip-flops and latches are basic storage elements in sequential logic, digital electronics systems for computers, communications, and many other types of systems.

Other digital elements may exist and operate internal to the silicon processor under test 205, but may not necessarily have state data stored therein, and thus, do not require operations to capture any state data. For example, a logic gate implements a Boolean function performing a logical operation on one or more logic inputs and producing a single logic output. Nevertheless, once performed, such digital elements 290 do not maintain state data which requires handling to capture via PSMI or at-speed scan capture or otherwise.

Figure 3:
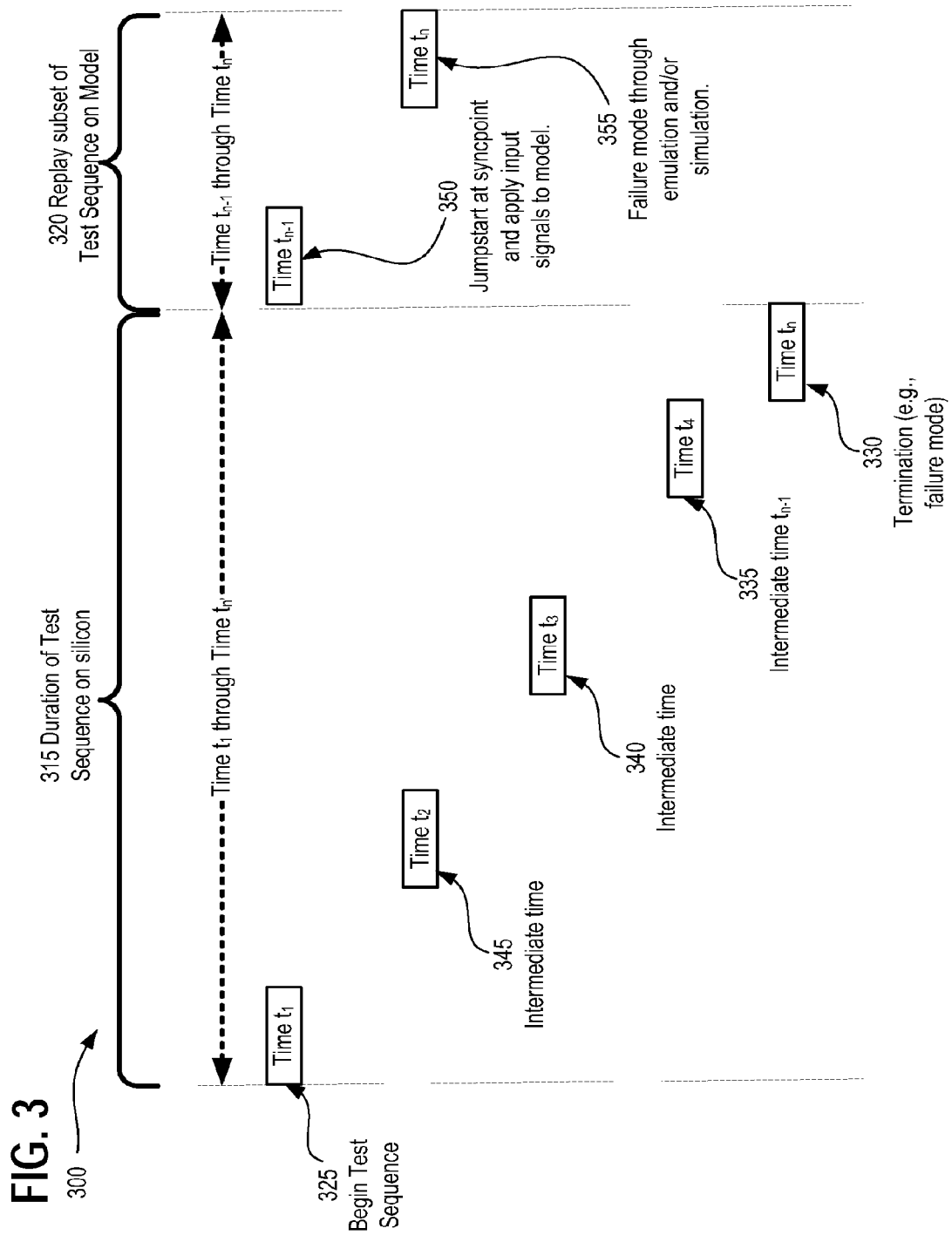
FIG. 3 illustrates an exemplary time chart in accordance with which embodiments may operate.

FIG. 3 illustrates an exemplary time chart 300 in accordance with which embodiments may operate. Depicted at element 315 is the duration of a test sequence 265 which exists from time $t_1$ through time $t_n$. For example, in one embodiment, time $t_1$ represents a start or beginning of the test sequence 325. In such an embodiment, time $t_n$ represents a termination 330 of the test sequence 265. For example, the termination of the test sequence at time $t_n$ 330 may occur at a failure mode of the silicon processor under test 205 induced by the test sequence 265.

In one embodiment, the scan capture device 245 captures the scan snapshot 220 for the silicon processor under test 205 at an intermediate time $t_{n-1}$ 335 during a duration of a test sequence 315 from time $t_1$ 325 to time $t_n$ 330. In one embodiment, the intermediate time $t_{n-1}$ 335 occurs after the start or beginning of the test sequence 325 at time $t_1$ and before the failure mode (e.g., termination 330) of the silicon processor under test 205 at time $t_n$.

In one embodiment, the scan capture device 245 repetitively captures the scan snapshot 220 on a recurring periodic basis during the duration of the test sequence 265 from time $t_1$ (e.g., beginning at 325) to time $t_n$ (e.g., termination 330). For example, within the duration of the test sequence on silicon 315, several intermediate times are depicted, including: intermediate time 345 at time $t_2$, intermediate time 340 at time $t_3$, and intermediate time $t_{n-1}$ 335 corresponding to time $t_4$. In such an embodiment, a scan capture is triggered at each of intermediate times 345, 340, and 335, however, the scan capture may be extracted only once. For example, a periodic interrupt may be injected into the test sequence at intervals, such as 5 ms or 100 ms, etc. On that interval, the test sequence is interrupted and a scan capture is triggered, but not necessarily extracted or communicated external to the silicon processor under test.

In one embodiment, a last captured scan snapshot 220 preceding a failure mode corresponding to the termination 330 of the test sequence 265 corresponds to the scan snapshot 220 at time $t_{n-1}$ (e.g., intermediate time 335 which is the last intermediate time preceding the failure mode at termination 330). Thus, it may not be known precisely when the duration of the test sequence on the silicon 315 will end, however, through the periodic interrupts at the intermediate times 345, 340, and 335, it can ensured that a scan capture is at a maximum, captured no more in the past than the duration of the repeating interval. For example, if the interval is 100 ms for repetitive scan captures, then a last captured scan snapshot, such as intermediate time 335 at time $t_{n-1}$ cannot, by definition, be more than 100 ms in the past, and so forth for other time durations.

In one embodiment, the model 250 of the silicon processor under test 205 replays the subset of the test sequence 265 (e.g., a subset of the duration of the test sequence on silicon depicted by element 315) from time $t_{n-1}$ (e.g., intermediate time 335) through time $t_n$ at the termination 330 or failure mode.

In one embodiment, the model 250 replaying the subset of the test sequence 265 includes performing the following operations: (a) jumpstart the model 250 of the silicon processor under test 205 to a syncpoint using the last captured scan snapshot 220 preceding the failure mode corresponding to the termination 330 of the test sequence 265 at time $t_{n-1}$, for example, at intermediate time 335 immediately preceding termination; (b) apply the captured input signals 210 to the model 250 of the silicon processor under test 205 starting from time $t_{n-1}$ at intermediate time 335; and (c) replay the subset of the test sequence 265 for the silicon processor under test 205 from time $t_{n-1}$ at intermediate time 335 through time $t_n$ at termination 330.

For example, element 320 depicts replaying a subset of the test sequence on the model from time $t_{n-1}$ through time $t_n$. This is accomplished by jumpstarting the test sequence at a captured syncpoint and applying the input signals to the model as set forth at element 350. Emulation or simulation or both then replay cycle accurately the test sequence from time $t_{n-1}$ through time $t_n$ on the model, and at time $t_n$ the failure mode is arrived at through the emulation and/or simulation as is set forth at element 355.

In one embodiment, time $t_n$ occurs at termination 330 of the test sequence 265 for the silicon processor under test 205 due to a failure mode induced from the test sequence 265. In such an embodiment, all changes to state data of the digital elements 290 integrated within the silicon processor under test 205 are viewable within the model 250 of the silicon processor under test 205 from time $t_{n-1}$ at intermediate time 335 through time $t_n$ at termination 330.

In one embodiment, the input signal capture device includes a logic analyzer 230B or one or more on-die logic components integrated with the silicon processor under test 205, or a combination of the logic analyzer 230B and the one or more on-die logic components to capture the input signals 210 as applied to the silicon processor under test 205. In such an embodiment, the input signal capture device captures the input signals 210 as applied to the silicon processor under test 205 on each and every cycle of the silicon processor under test 205 for the duration of a test sequence 315 from time $t_1$ 325 to time $t_n$ at termination 330.

In one embodiment, the silicon processor under test includes a central processing unit for one of a tablet computing device or a smart phone.

In one embodiment, a non-transitory computer readable storage medium has instructions stored thereon. When executed by a system, the instructions cause the system to perform operations including: capturing input signals applied to a silicon processor under test; capturing a scan snapshot representing a known state of a plurality of digital elements integrated within the silicon processor under test, each having state data for the silicon processor under test; storing the captured input signals and the captured scan snapshot to a storage point physically external from the silicon processor under test; jumpstarting a model of the silicon processor under test with the captured scan snapshot; and replaying a subset of a test sequence of silicon processor under test within the model of the silicon processor under test by applying the captured input signals to the model of the silicon processor under test from time $t_{n-1}$ through time $t_n$. In such an embodiment, time $t_n$ occurs at termination of the test sequence for the silicon processor under test due to a failure mode induced from the test sequence.

In one embodiment, performing the operations for capturing the scan snapshot representing a known state of a plurality of digital elements integrated within the silicon processor under test includes: (a) performing an at-speed scan capture of functional flops and latches within the silicon processor under test onto scan latches within the silicon processor under test; (b) quiescing the silicon processor under test to train and invalidate SRAMs (Static Random Access Memories) internal to the silicon processor under test; (c) capturing state data of the respective SRAMs after quiescing the silicon processor under test; (d) recommencing the test sequence after both of performing the at-speed scan capture and capturing state data of the respective SRAMs. In one embodiment, storing the captured scan snapshot to the storage point physically external from the silicon processor under test includes extracting the scan snapshot via an external interface after termination of the test sequence at time $t_n$.

Figure 4:
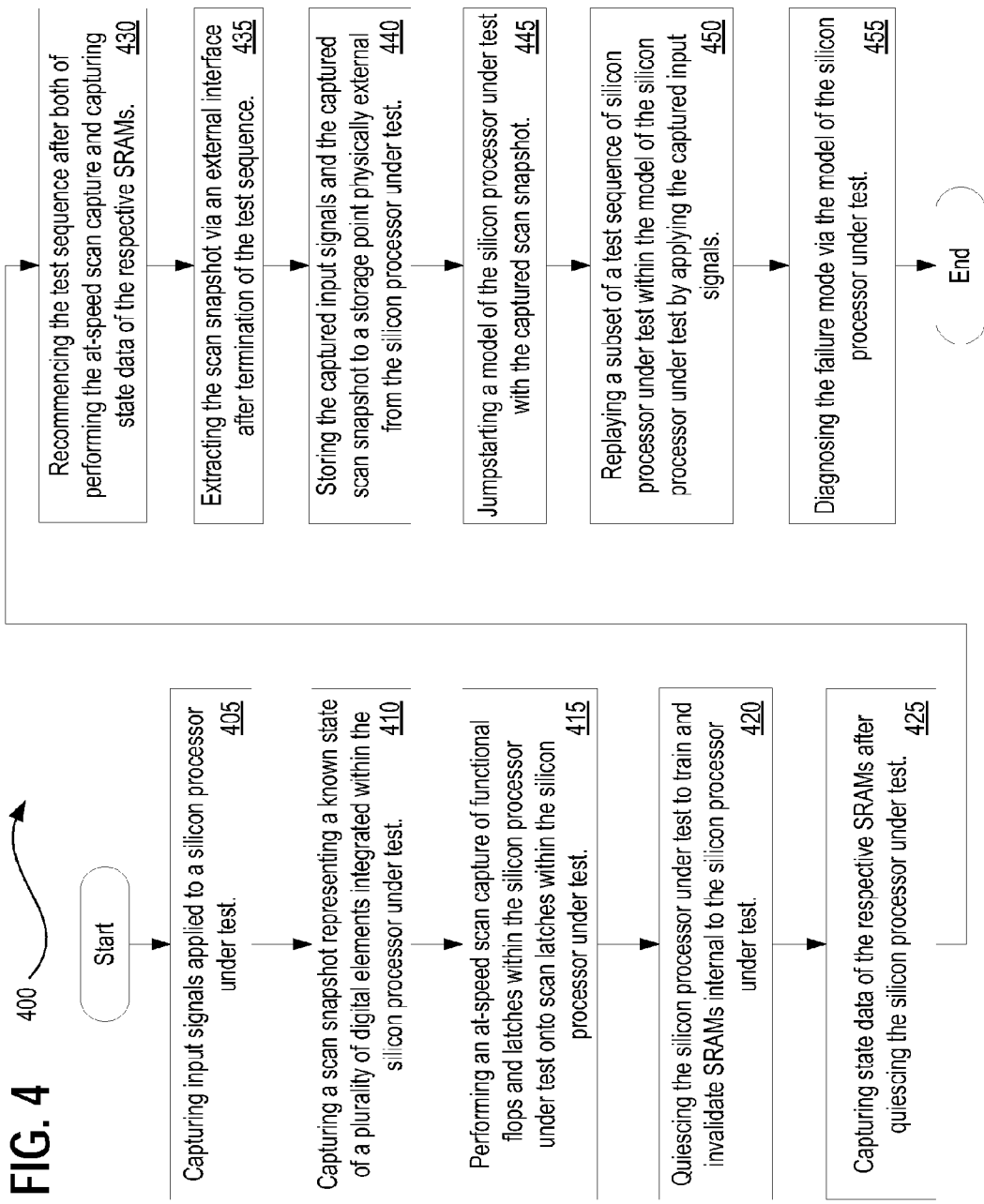
FIG. 4 is a flow diagram illustrating a method for implementing and using PSMI using at-speed scan capture in accordance with described embodiments.

FIG. 4 is a flow diagram 400 illustrating a method for implementing and using PSMI using at-speed scan capture in accordance with described embodiments. Method 400 may be performed by processing logic that may include hardware (e.g., circuitry, dedicated logic, programmable logic, microcode, etc.), software (e.g., instructions run on a processing device to perform the methodologies and operations described herein. Some of the blocks and/or operations of method 400 are optional in accordance with certain embodiments. The numbering of the blocks presented is for the sake of clarity and is not intended to prescribe an order of operations in which the various blocks must occur.

Method 400 begins with processing logic for capturing input signals applied to a silicon processor under test (block 405).

At block 410, processing logic captures a scan snapshot representing a known state of a plurality of digital elements integrated within the silicon processor under test.

At block 415, processing logic performs an at-speed scan capture of functional flops and latches within the silicon processor under test onto scan latches within the silicon processor under test.

At block 420, processing logic quiesces the silicon processor under test to train and invalidate SRAMs internal to the silicon processor under test.

At block 425, processing logic captures state data of the respective SRAMs after quiescing the silicon processor under test.

At block 430, processing logic recommences the test sequence after both of performing the at-speed scan capture and capturing state data of the respective SRAMs.

At block 435, processing logic extracts the scan snapshot via an external interface after termination of the test sequence.

At block 440, processing logic stores the captured input signals and the captured scan snapshot to a storage point physically external from the silicon processor under test.

At block 445, processing logic jumpstarts a model of the silicon processor under test with the captured scan snapshot.

At block 450, processing logic replays a subset of a test sequence of silicon processor under test within the model of the silicon processor under test by applying the captured input signals.

At block 455, a user diagnoses the failure mode via the model of the silicon processor under test.

Figure 5:
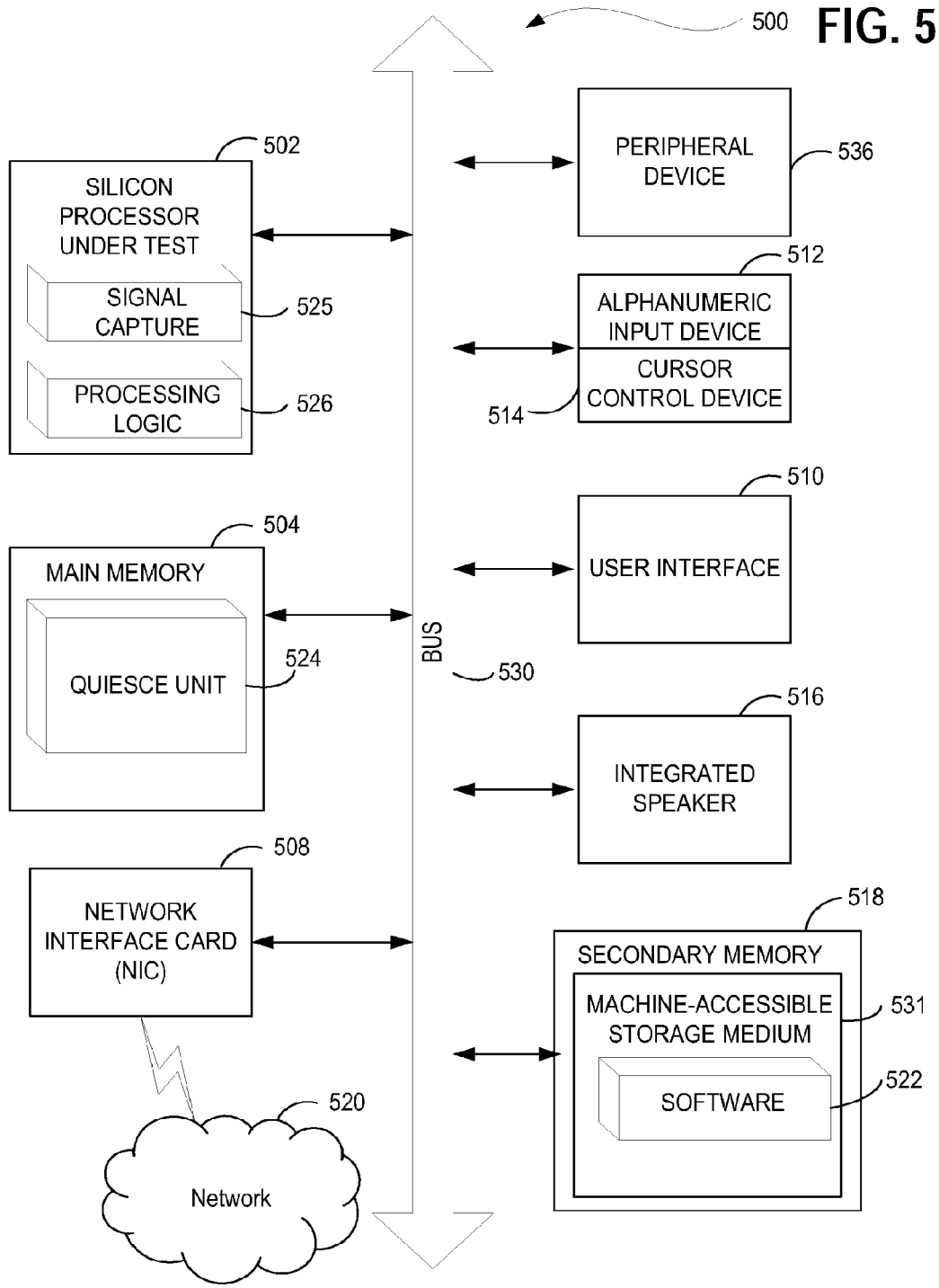
FIG. 5 illustrates a diagrammatic representation of a machine in the exemplary form of a computer system, in accordance with one embodiment.

FIG. 5 illustrates a diagrammatic representation of a machine 500 having a silicon process under test in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a smart phone, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a silicon processor under test 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives), which communicate with each other via a bus 530. Main memory 504 includes a quiesce unit 524 to trigger and coordinate a quiesce phase within the silicon processor under test 502. The silicon processor under test 502 operates in conjunction with the processing logic 526 to perform the methodologies discussed herein. In one embodiment the silicon processor under test 502 utilizes a signal capture 525 internal to the silicon processor under test 502 to capture input signals.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the silicon processor under test 502 during execution thereof by the computer system 500. The software 522 may further be transmitted or received over a network 520 via the network interface card 508.

Figure 6:
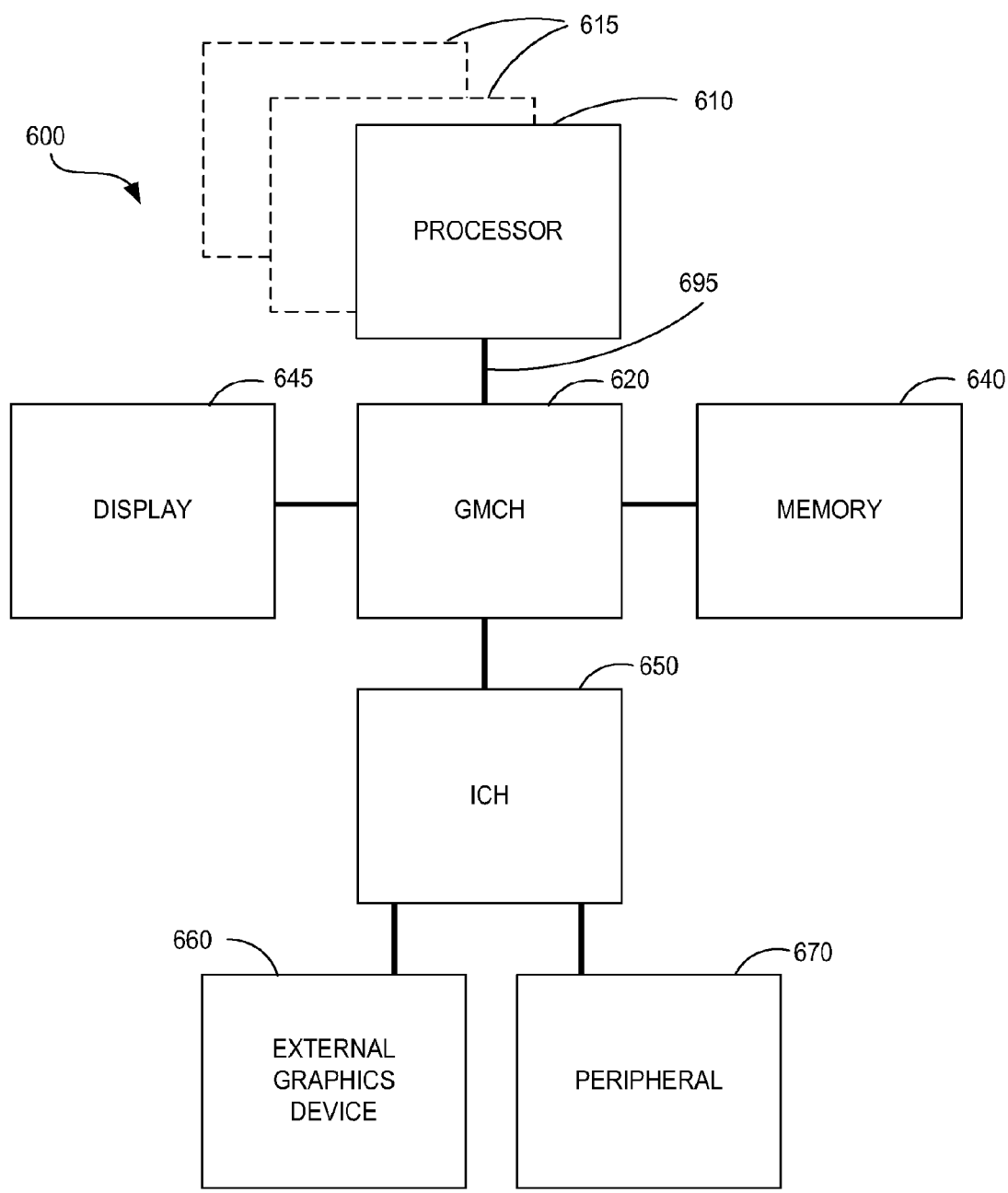
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the silicon processor under test 502. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
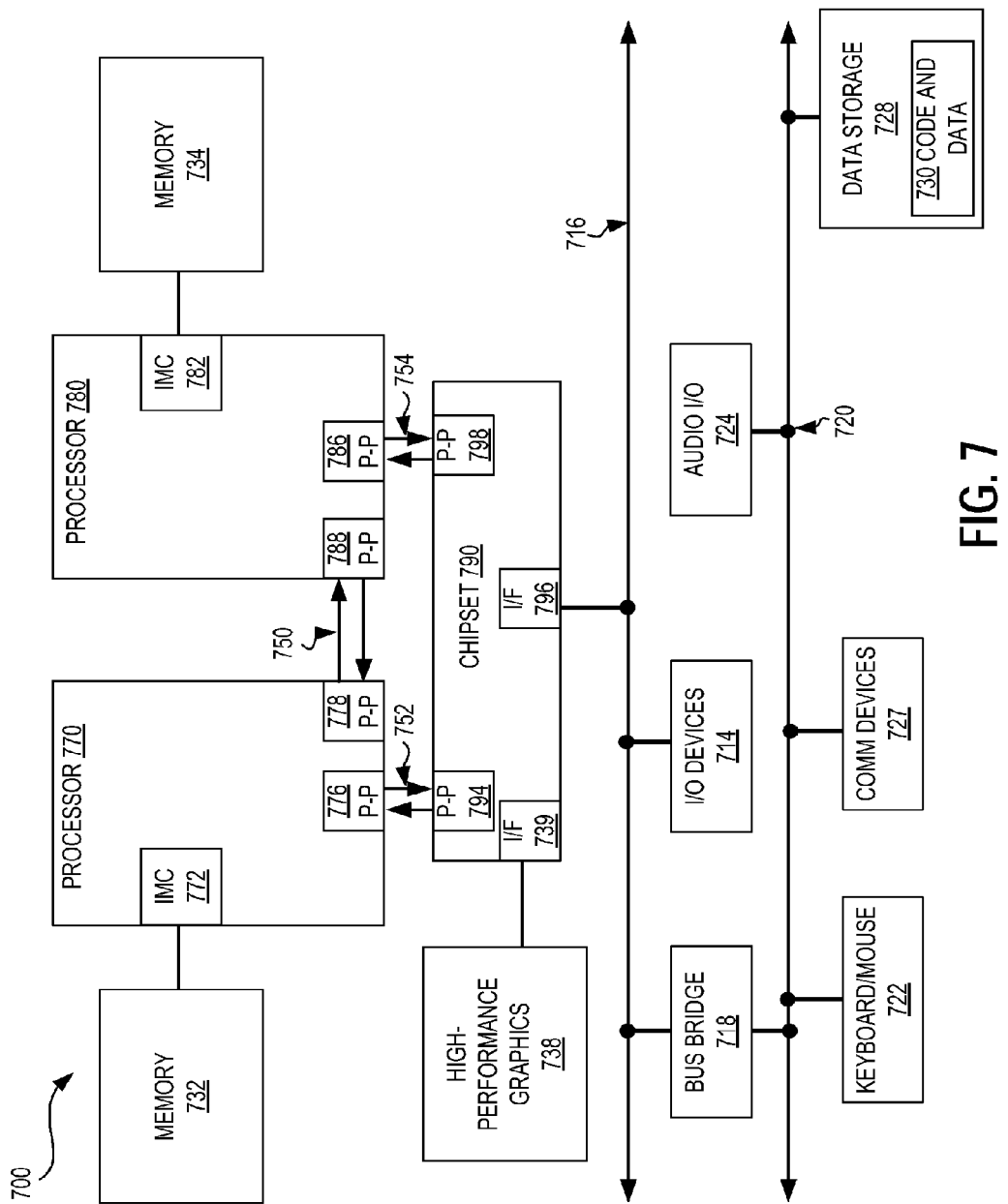
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
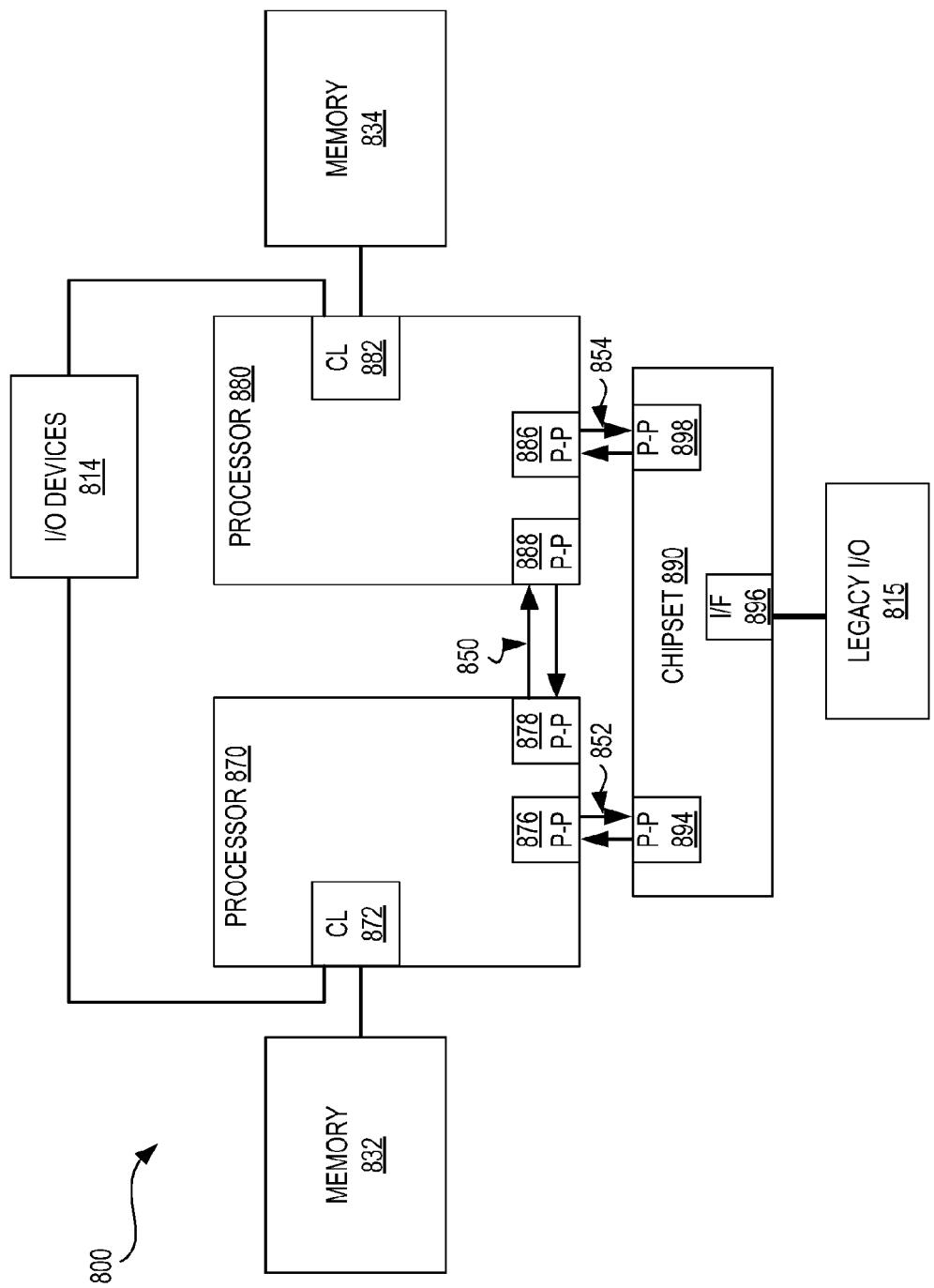
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
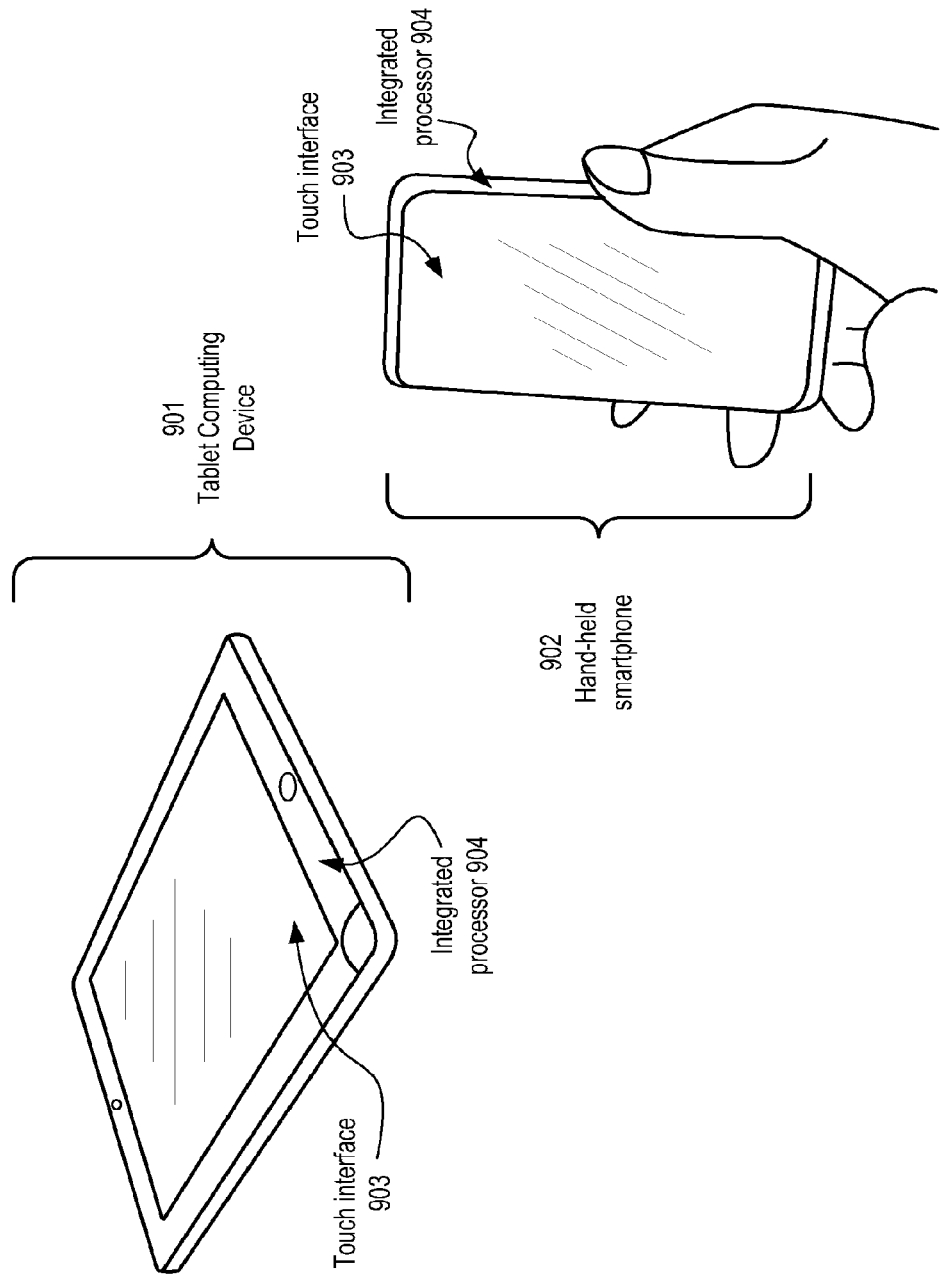
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touch interface 903 and an integrated processor 904 in accordance with disclosed embodiments.

Figure 10:
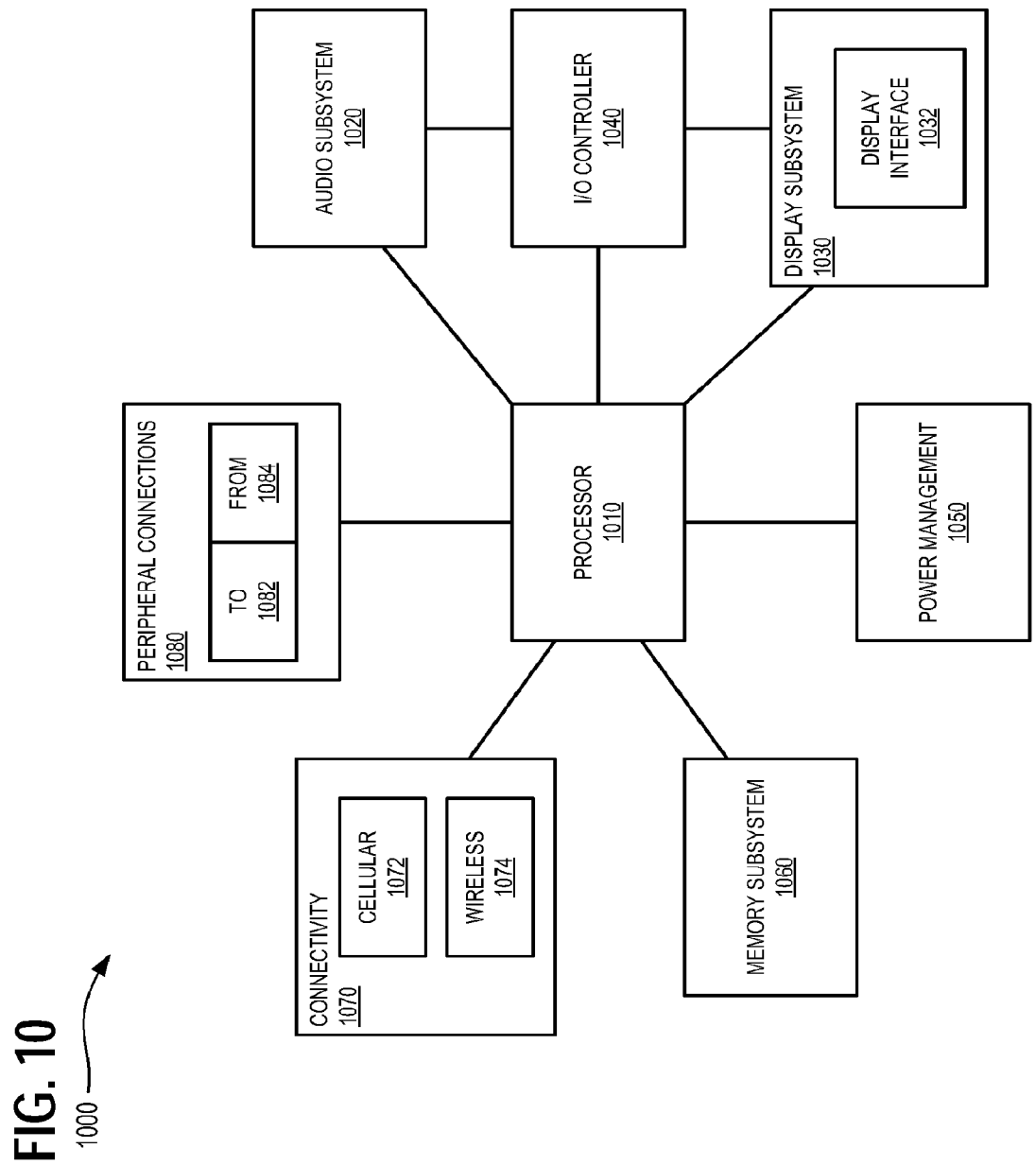
FIG. 10 is a block diagram of an embodiment of tablet computing device, a smart phone, or other mobile device in which touchscreen interface connectors are used.

FIG. 10 is a block diagram 1000 of an embodiment of tablet computing device, a smart phone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1010.

Display subsystem 1030 represents hardware (e.g., display devices) and software (e.g., drivers) components that provide a visual and/or tactile display for a user to interact with the tablet computing device or smart phone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smart phone through which a user might interact. In one embodiment, I/O controller 1040 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1050 that manages battery power usage, charging of the battery, and features related to power saving operation. Memory subsystem 1060 includes memory devices for storing information in the tablet computing device or smart phone. Connectivity 1070 includes hardware devices (e.g., wireless and/or wired connectors and communication hardware) and software components (e.g., drivers, protocol stacks) to the tablet computing device or smart phone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smart phone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
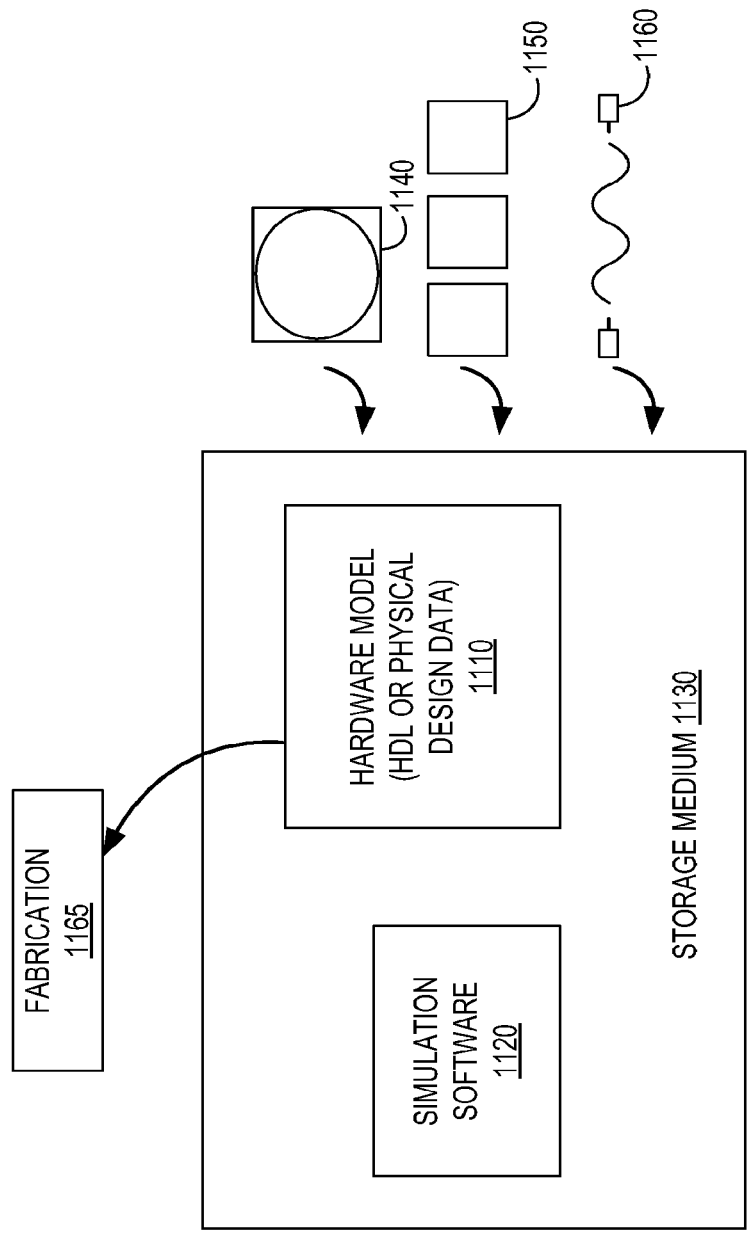
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
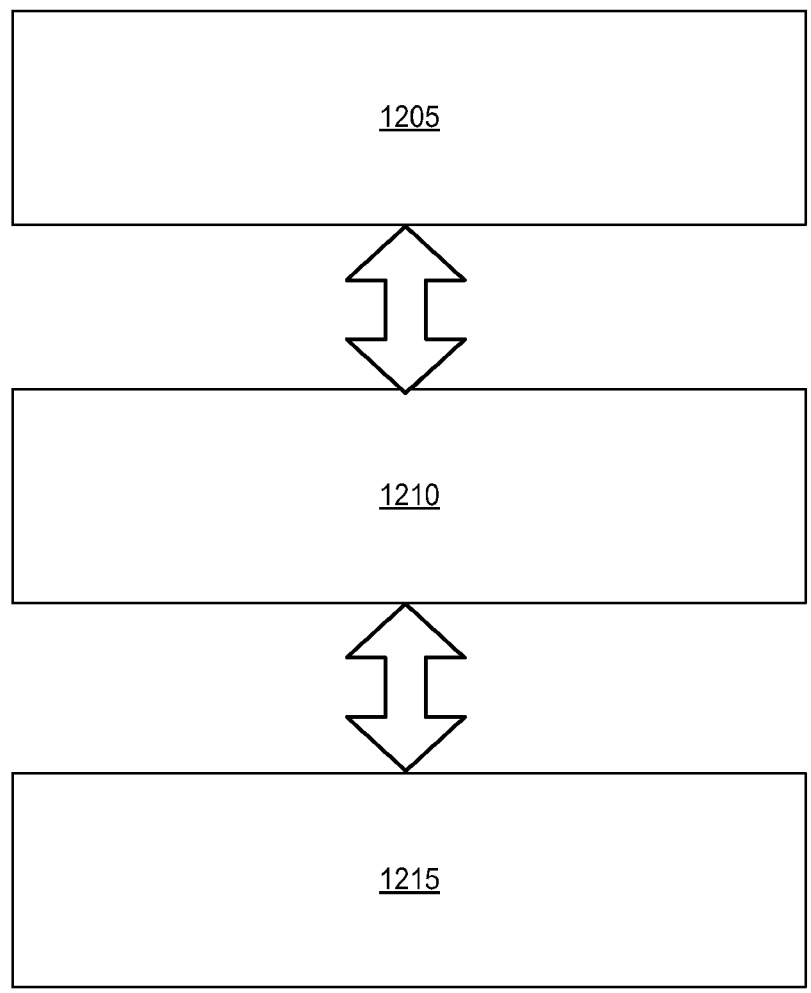
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
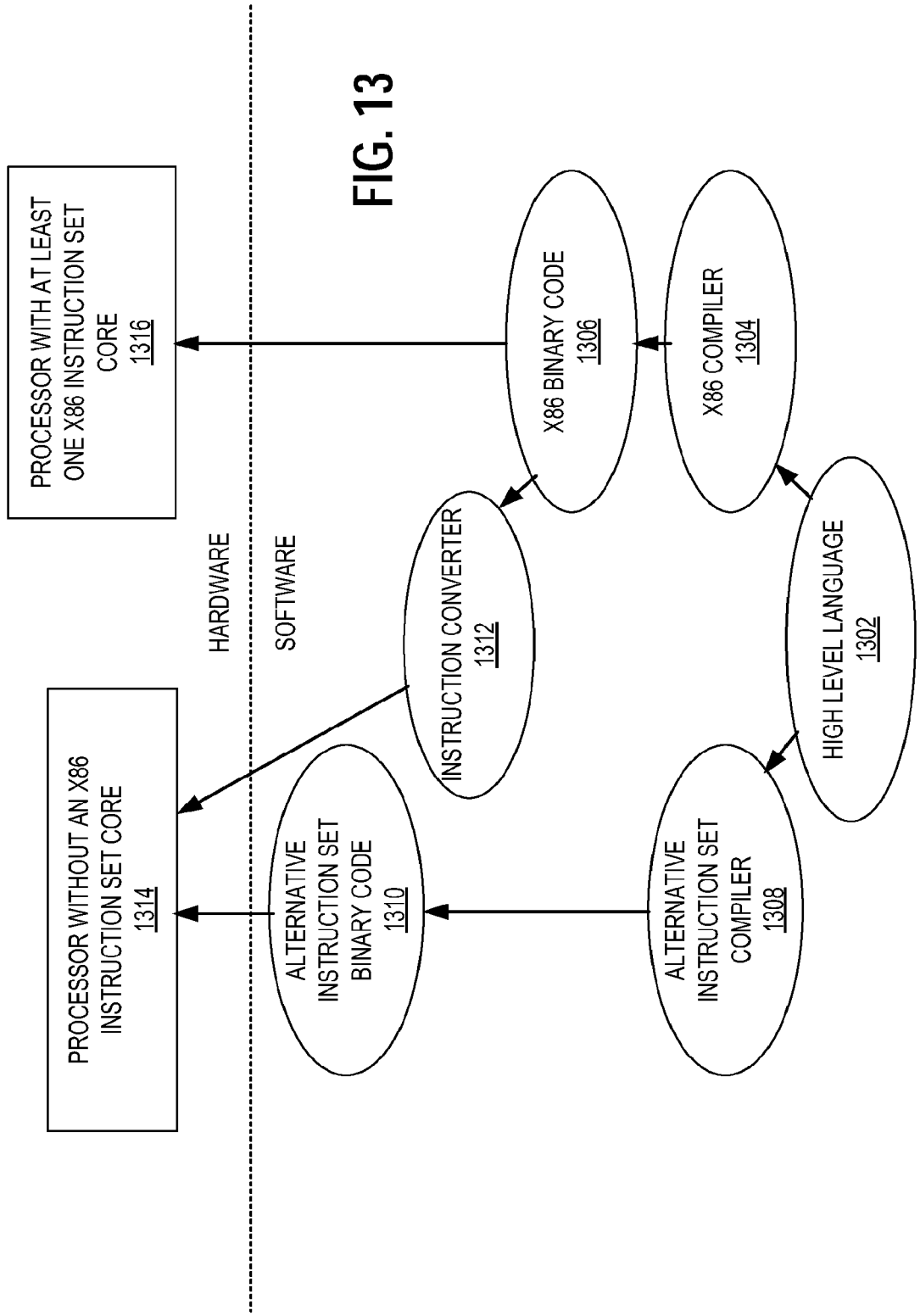
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
   a hardware processor including,
      an input signal capture device to capture input signals input to a silicon processor under test,
      a scan capture device to capture a scan snapshot representing a known state of a plurality of digital elements integrated within the silicon processor under test, each having state data for the silicon processor under test, and
      a scan read-out device to communicate the captured scan snapshot to a storage point physically external from the silicon processor under test; and
   a model of the silicon processor under test to replay a subset of a test sequence for the silicon processor under test based at least in part on the captured input signals and the captured scan snapshot,
   wherein the scan capture device comprises an at-speed scan capture device to trigger an at speed capture of functional flops and latches within the silicon processor under test onto scan latches within the silicon processor under test.

2. The system of claim 1, wherein the model of the silicon processor under test to replay the subset of the test sequence for the silicon processor under test comprises the model of the silicon processor under test to replay the subset of the test sequence external to and physically separate from the silicon processor under test.

3. The system of claim 1, wherein the model of the silicon processor under test to replay the subset of the test sequence for the silicon processor under test comprises the model of the silicon processor under test to produce a cycle accurate representation of the subset of the test sequence for the silicon processor under test within the model.

4. The system of claim 1, wherein the model of the silicon processor under test comprises a simulator implemented in software, an emulator implemented via a field-programmable gate array (FPGA) integrated circuit, or a combination of both the simulator and the emulator.

5. The system of claim 1, wherein the at-speed scan capture device to capture the functional flops and latches onto the scan latches without altering state data within the functional flops and latches and without requiring termination of the test sequence.

6. The system of claim 1, wherein the silicon processor under test to recommence the test sequence on the silicon processor under test after the capture of the functional flops and latches onto the scan latches; and wherein the scan read-out device comprises a test access port (TAP) to communicate the captured scan snapshot to a storage point physically external from the silicon processor under test after termination of the test sequence due to a failure mode of the silicon processor under test.

7. The system of claim 1, wherein the scan read-out device comprises an external interface to extract the captured scan snapshot from the silicon processor under test to the storage point physically external from the silicon processor under test.

8. The system of claim 1, wherein the scan capture device comprises:
   a quiesce unit to quiesce the silicon processor under test to train and invalidate SRAMs (Static Random Access Memories) internal to the silicon processor under test and wherein the quiesce unit is further to capture state data of the respective SRAMs.

9. The system of claim 1, wherein the scan capture device captures the scan snapshot by stopping the clock and initiating a single clock pulse triggering the capture of the scan snapshot from a present state to the captured state for the scan snapshot representing the known state of a plurality of digital elements integrated within the silicon processor under test.

10. The system of claim 1, wherein the scan capture device comprises a quiesce unit to quiesce the silicon processor under test before the scan snapshot is captured.

11. The system of claim 10, wherein the silicon processor under test performs one or more of the following operations during a quiesce phase responsive to the quiesce unit:
   stop accepting new requests;
   waiting for all prior requests to complete;
   invalidating a first plurality of on-die SRAMs (Static Random Access Memories) due to entry into the quiesce phase;
   flushing a second plurality of on-die SRAMs to an invalid state responsive to a flush instruction initiated during the quiesce phase;
   invalidating a first plurality of flip-flop and latch circuits internal to the silicon processor under test due to entry into the quiesce phase; and
   copying state data from a second plurality of flip-flop and latch circuits internal to the silicon processor under test into a corresponding plurality of shadow flops, each of the shadow flops to preserve the copied state data as known state data for the corresponding second plurality of flip-flop and latch circuits.

12. The system of claim 1, wherein the plurality of digital elements integrated within the silicon processor under test comprises digital elements selected from the group comprising:
   flip-flop circuits, each having state data in the silicon processor under test;
   latch circuits, each having state data in the silicon processor under test; and
   on-die cache SRAMs (Static Random Access Memories) having memory to store state data within the silicon processor under test.

13. The system of claim 1, wherein the scan capture device captures the scan snapshot for the silicon processor under test at an intermediate time $t_{n-1}$ during a duration of a test sequence from time $t_1$ to time $t_n$, wherein time $t_1$ represents a start of the test sequence and wherein time $t_n$ represents a termination of the test sequence.

14. The system of claim 13, wherein the termination of the test sequence at time $t_n$ occurs at a failure mode of the silicon processor under test induced by the test sequence; and wherein the intermediate time $t_{n-1}$ occurs after the start of test sequence at time $t_1$ and before the failure mode of the silicon processor under test at time $t_n$.

15. The system of claim 13, wherein the scan capture device to capture the scan snapshot comprises the scan capture device to repetitively capture the scan snapshot on a recurring periodic basis during the duration of the test sequence from time $t_1$ to time $t_n$, wherein a last captured scan snapshot preceding a failure mode corresponding to the termination of the test sequence corresponds to the scan snapshot at time $t_{n-1}$.

16. The system of claim 13, wherein the model of the silicon processor under test to replay the subset of the test sequence for the silicon processor under test comprises the model of the silicon processor under test to:
   (a) jumpstart the model of the silicon processor under test to a syncpoint using the last captured scan snapshot preceding the failure mode corresponding to the termination of the test sequence at time $t_{n-1}$;
   (b) apply the captured input signals to the model of the silicon processor under test starting from time $t_{n-1}$;
   (c) replay the subset of the test sequence for the silicon processor under test from time $t_{n-1}$ through time $t_n$, wherein time $t_n$ occurs at termination of the test sequence for the silicon processor under test due to a failure mode induced from the test sequence; and
   wherein all changes to state data of the digital elements integrated within the silicon processor under test are viewable within the model of the silicon processor under test from time $t_{n-1}$ through time $t_n$.

17. The system of claim 1, wherein the input signal capture device comprises a logic analyzer to capture the input signals applied to the silicon processor under test.

18. The system of claim 1, wherein the input signal capture device comprises one or more on-die logic components integrated with the silicon processor under test to capture the input signals into the silicon processor under test.

19. The system of claim 1, wherein the input signal capture device comprises a logic analyzer or one or more on-die logic components integrated with the silicon processor under test, or a combination of the logic analyzer and the one or more on-die logic components to capture the input signals as applied to the silicon processor under test; and wherein the input signal capture device captures the input signals as applied to the silicon processor under test on each and every cycle of the silicon processor under test for the duration of a test sequence from time $t_1$ to time $t_n$.

20. The system of claim 1, wherein the input signal capture device comprises an external interface to further communicate the captured input signals to a storage point physically external from the silicon processor under test for persistent storage and later retrieval.

21. A method comprising:
   capturing input signals applied to a silicon processor under test;
   capturing a scan snapshot representing a known state of a plurality of digital elements integrated within the silicon processor under test, each having state data for the silicon processor under test by,
      (a) performing an at-speed scan capture of functional flops and latches within the silicon processor under test onto scan latches within the silicon processor under test,
      (b) quiescing the silicon processor under test to train and invalidate SRAMs (Static Random Access Memories) internal to the silicon processor under test,
      (c) capturing state data of the respective SRAMs after quiescing the silicon processor under test,
      (d) recommencing the test sequence after both of performing the at-speed scan capture and capturing state data of the respective SRAMs;
   storing the captured input signals and the captured scan snapshot to a storage point physically external from the silicon processor under test, wherein storing the captured scan snapshot to the storage point physically external from the silicon processor under test comprises extracting the scan snapshot via an external interface after termination of the test sequence at time $t_n$;
   jumpstarting a model of the silicon processor under test with the captured scan snapshot; and
   replaying a subset of a test sequence of silicon processor under test within the model of the silicon processor under test by applying the captured input signals to the model of the silicon processor under test from time $t_{n-1}$ through time $t_n$, wherein time $t_n$ occurs at termination of the test sequence for the silicon processor under test due to a failure mode induced from the test sequence.

22. The method of claim 21, wherein the silicon processor under test comprises a central processing unit for one of a tablet computing device or a smart phone.

23. A non-transitory computer readable storage medium having instructions stored thereon that, when executed by a system, the instructions cause the system to perform operations comprising:
   capturing input signals applied to a silicon processor under test;
   capturing a scan snapshot representing a known state of a plurality of digital elements integrated within the silicon processor under test, each having state data for the silicon processor under test by,
      (a) performing an at-speed scan capture of functional flops and latches within the silicon processor under test onto scan latches within the silicon processor under test,
      (b) quiescing the silicon processor under test to train and invalidate SRAMs (Static Random Access Memories) internal to the silicon processor under test,
      (c) capturing state data of the respective SRAMs after quiescing the silicon processor under test,
      (d) recommencing the test sequence after both of performing the at-speed scan capture and capturing state data of the respective SRAMs;

storing the captured input signals and the captured scan snapshot to a storage point physically external from the silicon processor under test, wherein storing the captured scan snapshot to the storage point physically external from the silicon processor under test comprises extracting the scan snapshot via an external interface after termination of the test sequence at time $t_n$;

jumpstarting a model of the silicon processor under test with the captured scan snapshot; and replaying a subset of a test sequence of silicon processor under test within the model of the silicon processor under test by applying the captured input signals to the model of the silicon processor under test from time $t_{n-1}$ through time $t_n$, wherein time $t_n$ occurs at termination of the test sequence for the silicon processor under test due to a failure mode induced from the test sequence.

\* \* \* \* \*